United States Patent [19]

Honma et al.

[11] Patent Number: 4,526,145

[45] Date of Patent: Jul. 2, 1985

[54] FUEL INJECTION QUANTITY ADJUSTMENT APPARATUS FOR FUEL INJECTION PUMP

[75] Inventors: Masahiro Honma; Iwane Inokuchi, both of Yokosuka, Japan

[73] Assignee: Nissan Motor Company, Limited, Japan

[21] Appl. No.: 432,382

[22] Filed: Sep. 30, 1982

[30] Foreign Application Priority Data

Oct. 6, 1981 [JP] Japan ............... 56-158138

[51] Int. Cl.³ .......................... F02M 59/20
[52] U.S. Cl. ................... 123/357; 103/449; 103/198 D; 417/289
[58] Field of Search ............ 123/357, 449, 198 D, 123/198 DB, 479; 73/119 A; 417/289, 282

[56] References Cited

U.S. PATENT DOCUMENTS

| 3,333,542 | 8/1967 | Eheim | 123/357 |
| 3,630,643 | 12/1971 | Eheim et al. | 123/449 |
| 4,036,193 | 7/1977 | Kobayashi et al. | 123/139 |
| 4,050,856 | 9/1977 | Kobayashi et al. | 417/289 |
| 4,391,257 | 7/1983 | Eheim | 123/198 DB |
| 4,395,905 | 8/1983 | Fujimori | 123/479 |
| 4,407,245 | 10/1983 | Eheim | 123/198 DB |

FOREIGN PATENT DOCUMENTS

| 0034936 | 2/1981 | European Pat. Off. | 123/458 |
| 5423 | 1/1980 | Japan | 123/449 |
| 38555 | 4/1981 | Japan | 123/449 |
| 60852 | 5/1981 | Japan | 123/449 |
| 88957 | 7/1981 | Japan | 123/449 |
| 56631 | 4/1982 | Japan | 123/449 |

Primary Examiner—Carl Stuart Miller
Attorney, Agent, or Firm—Lowe, King, Price & Becker

[57] ABSTRACT

A pair of solenoids are disposed coaxially with and around a hollow cylindrical cut-off valve. The valve includes an inner non-magnetic sleeve and an outer permanent magnet sleeve. The cut-off valve slidably engages a fuel distributing plunger which injects fuel according to its axial reciprocation. The cut-off valve controls fuel injection quantity via timing of exposure of a fuel injection cut-off port in the plunger. When the pair of solenoids are energized in accordance with operating parameters of the engine, the cut-off valve is moved to a corresponding position along the plunger. A sensor senses the actual position of the cut-off valve for feedback control thereof. A pair of disc-like permanent magnets may be disposed opposite either extreme of travel of the cut-off valve in spaced relationship thereto. A pair of non-magnetic discs may be disposed in place of the pair of disc-like permanent magnets. A biasing member may be disposed between the cut-off valve and the plunger housing to prevent the cut-off valve from being attracted by the plunger housing and for preventing rotation of the cut-off valve relative to the plunger housing. The biasing member may be diaphragm, coil spring or a leaf spring.

21 Claims, 16 Drawing Figures

FUEL INJECTION QUANTITY ADJUSTMENT APPARATUS FOR FUEL INJECTION PUMP

BACKGROUND OF THE INVENTION

The present invention relates to a fuel injection pump for an internal combustion engine, and more particularly to a fuel injection adjusting apparatus for the pump in which a hollow cylindrical fuel cut-off valve opens and closes a fuel escape port in a fuel distributing plunger which is rotationally and reciprocally driven therethrough.

U.S. Pat. No. 3,630,643 to Eheim et al discloses a fuel injection pump which includes a fuel distributing plunger which is rotationally and reciprocally driven by the rotation of a cam disc connected to a drive shaft of an internal combustion engine. When the plunger is in its rarefaction stroke, an intake groove in the plunger can communicate with a fuel inlet passage so that fuel is drawn into a working space which is compressed during the compression stroke of the plunger, so that fuel in the plunger working space is injected via an axial passage in the plunger, one of a plurality of check valves and a corresponding injector into the corresponding cylinder when the axial passage in the plunger communicates during its rotation with a corresponding fuel passage leading to the check valve.

Fuel injection by the pump terminates when fuel in the working space is vented into a chamber within the pump housing via a cut-off port provided in the plunger. The part opens and closes via axial displacement of a hollow cylindrical cut-off valve slidably fitted over the plunger.

A mechanism which controls the cut-off valve includes a pair of electromagnetic windings or solenoids wound around a C-shaped core and a magnet disposed pivotably within the magnetic field of the core. The magnet is supported by a shaft, the lower end of which carries an eccentrically mounted ball-and-socket joint in conjunction with the cut-off valve, whereby rotation of the magnet is transmitted to axially move the cut-off valve.

The electric current flowing through the pair of electromagnetic windings or solenoids and therefore the angular motion of the magnet are controlled by an amplifier in accordance with the output of a controller which receives signals indicative of operating parameters of the internal combustion engine, for example, engine speed, accelerator pedal position, air intake pressure, engine temperature, atmospheric temperature, etc.

With this conventional fuel injection pump, since the torque of the pivoting magnet is transmitted to the cut-off valve via its shaft and the eccentrically mounted ball-and-socket joint, the mechanism is considerably complicated. Also design tolerances and normal wear on the ball-and-socket joint produce errors in the displacement of the cut-off valve.

In addition, a conventional position sensor senses the position of the cut-off valve indirectly in such a manner that instead of sensing the axial displacement of the cut-off valve, the rotation of the magnet is converted into linear displacement of a ferrite core, which linear displacement is sensed by a pair of inductance coils wound around the ferrite core and energized by an oscillator. This does not result in good control accuracy.

SUMMARY OF THE INVENTION

It is an object of the present invention to provide a fuel injection quantity adjusting apparatus for a fuel injection pump with improved control accuracy.

According to the present invention, the hollow cylindrical cut-off valve fitting slidably over the fuel distributing plunger includes a permanent magnet. A pair of drive solenoids are coaxially disposed around the cut-off valve and supplied with a control current determined in accordance with engine operating parameters. Energization of the solenoid magnetically moves the cut-off valve along the plunger. A position sensor electromagnetically senses the actual position of the cut-off valve to produce a signal indicative thereof for feedback control of the cut-off valve position.

BRIEF DESCRIPTION OF THE DRAWINGS

The same reference numeral denotes similar parts throughout the drawings in which.

DETAILED DESCRIPTION OF THE PREFERRED AND ALTERNATIVE EMBODIMENTS

Figure 1:
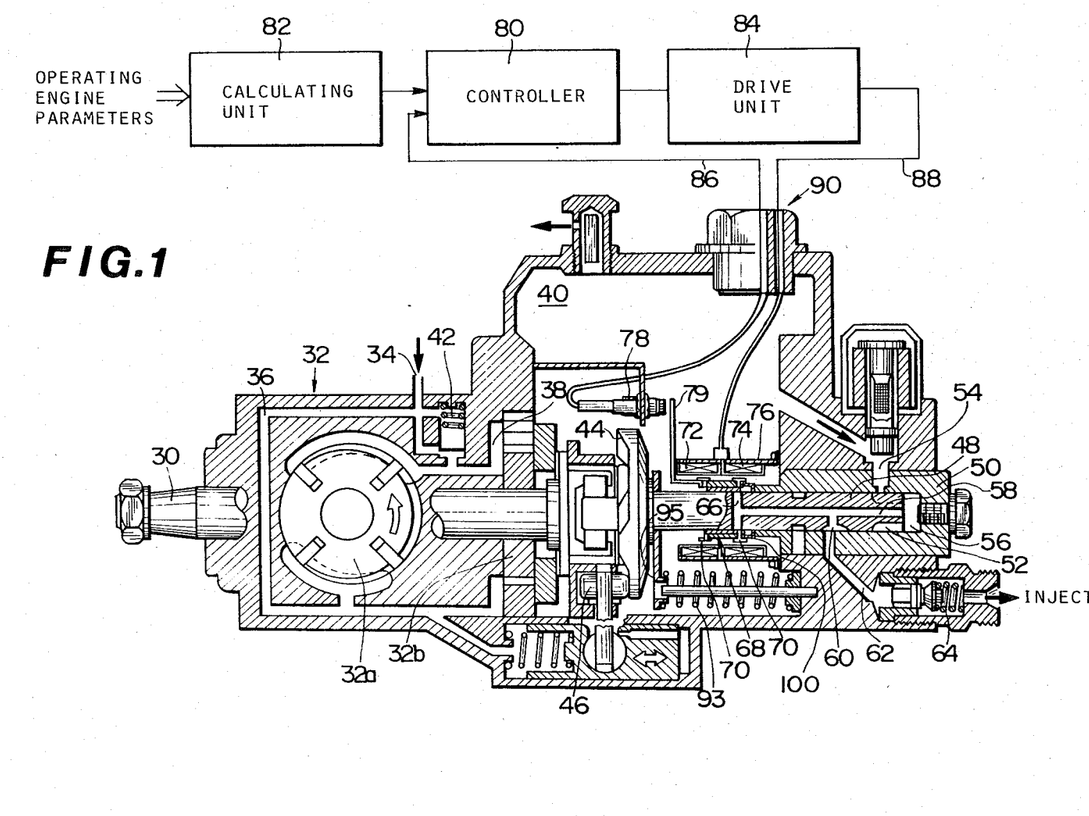
FIG. 1 is a cross-sectional view of a fuel injection pump in which the present invention is applied.

Referring to FIGS. 1 to 4 of the drawings, there is shown a fuel injection pump in which a preferred embodiment of a fuel injection quantity adjusting apparatus according to the present invention is incorporated. When an internal combustion engine, not shown, operates, the shaft 30 of a feed pump 32 (reference 32a shows feed pump rotor 32b rotated through 90° for ease of understanding) is driven synchronously with the engine. As a result, fuel is drawn via an inlet 34 and passageways 36 and 38 into a reservoir chamber 40 within the pump housing. Reference numeral 42 denotes a pressure regulating valve to regulate the pressure of fuel supplied to the chamber 40. A cam disc 44 is rotated by shaft 30 and simultaneously displaced axially by interaction with a set of substantially stationary rollers 46. A fuel distributing plunger 48 is connected at one end to disc 44 so that it is also driven rotationally and reciprocally within a plunger housing 50. In the fuel intake stroke, i.e., when plunger 48 starts to move to the left as seen in FIG. 1, one of a plurality of intake grooves 52 arranged radially symmetrically around the free end of plunger 48 can communicate with a fuel intake passageway 54, at which time fuel within the pump housing is drawn into a working space 56 at the enclosed end of plunger housing 50. By the time the plunger 48 has finished its intake stroke, it has been rotated so that the intake groove 52 no longer communicates with the intake passageway 54 so that the fuel previously admitted into the working space 56 is confined therewithin. The plunger 48 then begins its compression stroke in which fuel within working space 56 is forced via an axial passageway 58, an outlet groove 60, one of a plurality of injection passageways 62 communicating with outlet groove 60, and a corresponding check valve 64 into a corresponding injector, not shown.

When a cut-off port 66, communicating with axial passageway 58 and covered by a cut-off valve 68 through part of the stroke of the plunger 48, is exposed to the chamber 40, fuel in working space 56 is vented via axial passageway 58 and cut-off port 66 into chamber 40. Accordingly, although plunger 48 is moving to the right in FIG. 1, fuel is not forced out via check valve 64 into the corresponding cylinder. By changing the timing at which cut-off valve 68 exposes cut-off port 66, the timing of the end of fuel injection and therefore fuel injection quantity can be adjusted.

Figure 2:
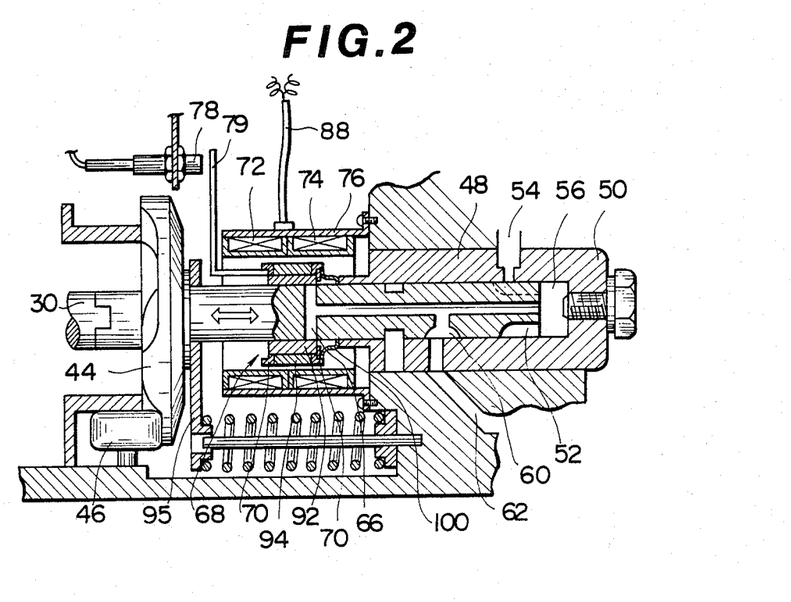
FIG. 2 is an enlarged cross-sectional view of the essential portion of the fuel injection pump of FIG. 1.

In this particular embodiment, cut-off valve 68 includes an inner non-magnetic sleeve 92 and an outer permanent magnet sleeve 94 and a pair of pole pieces 70, one attached to each end face of permanent magnet sleeve 94, as best seen in FIG. 2. Non-magnetic sleeve 92 is made of stainless steel, ceramic, aluminum plated with rigid chromium or sapphire and prevents magnetic attraction between outer sleeve 94 and plunger 48 to facilitate the axial movement of cut-off valve 68.

In order to displace cut-off valve 68 axially along plunger 48, a pair of axially spaced drive solenoids 72, 74 are coaxially disposed around cut-off valve 68 at an appropriate distance therefrom. The outer circumferences of drive solenoids 72, 74 are surrounded by a yoke 76 which serves to define the limits of the magnetic field produced by solenoids 72, 74 and to protect solenoids 72, 74.

Cut-off valve 68 and drive solenoids 72, 74 constitute the essential portion of the fuel injection quantity adjusting apparatus.

A position sensor 78 which may be a magnetic sensor is provided in the vicinity of one end of an elongated ferromagnetic extension 79, the other end of which is connected to left-hand pole piece 70 to magnetically sense the axial displacement of cut-off valve 68 without contacting same. A pair of members, not shown, are provided one on each side of extension 79 so as to limit the rotation of extension 79 around plunger 48 to within a small range, thereby allowing sensor 78 to sense the position of cut-off valve 68. The output of sensor 78 is supplied as a feedback signal via leads 86 to an input terminal of a controller 80, another input terminal of which receives the output of a calculating unit 82 calculated in accordance with different operating engine parameters; engine speed, accelerator pedal position, intake air vacuum, etc. Controller 80 controls the energizing currents flowing through drive solenoids 72, 74 via a drive unit 84 to magnetically displace cut-off valve 68 to a position at which the two inputs to controller 80 are equal. The outgoing lead 86 over which the output of sensor 78 is transmitted and an ingoing lead 88 over which the output of drive unit 84 is transmitted are threaded through a common connector 90 received in the pump housing to be connected to drive solenoids 72, 74 and sensor 78. Reference numeral 100 denotes a non-magnetic spring disposed between cut-off valve 68 and plunger housing 50 around plunger 48, which biases cut-off valve 68 to the left as seen in FIG. 1, and reference numeral 93 denotes a spring which urges plunger 48 against cam disc 44 via a push plate 95.

Figure 3:
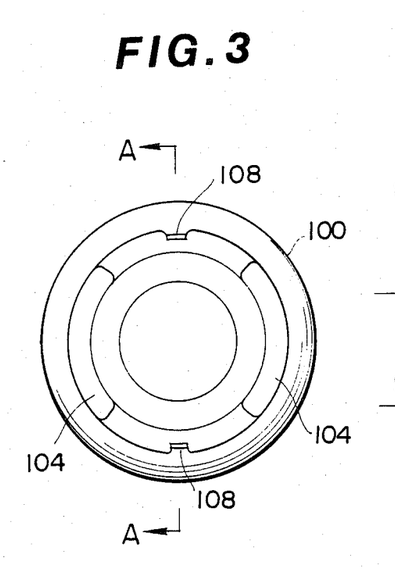
FIG. 3 is an enlarged front view of a diaphragm used in the pump of FIG. 2.
Figure 4:
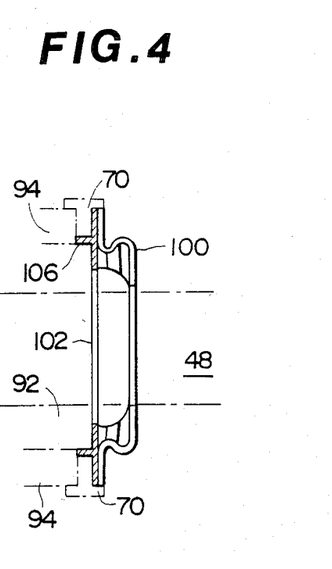
FIG. 4 is a cross-sectional view taken along line A—A in FIG. 3.

As will be best seen in FIGS. 3 and 4, non-magnetic spring 100 may include a diaphragm 100 which is provided with a pair of diametrically opposed arcuate openings 104 which allow fuel to pass therethrough and thereby facilitate the reciprocal movement of cut-off valve 68. Diaphragm is secured along the periphery of one side therof to plunger housing 50 and the other side thereof to a magnetic ring 102. This magnetic ring 102 has spaced pegs 106 tightly received in corresponding grooves 108 provided in the adjacent pole piece 70 of cut-off valve 68 so that magnetic ring 102 is rigidly connected by magnetic attraction to cut-off valve 68. Thus, diaphragm 100, magnetic ring 102 and cut-off valve 68 do not rotate relative to plunger housing 50, thereby preventing misalignment of magnetic extension 79 with sensor 78 to perform accurate control of positioning of cut-off valve 68.

Figure 5:
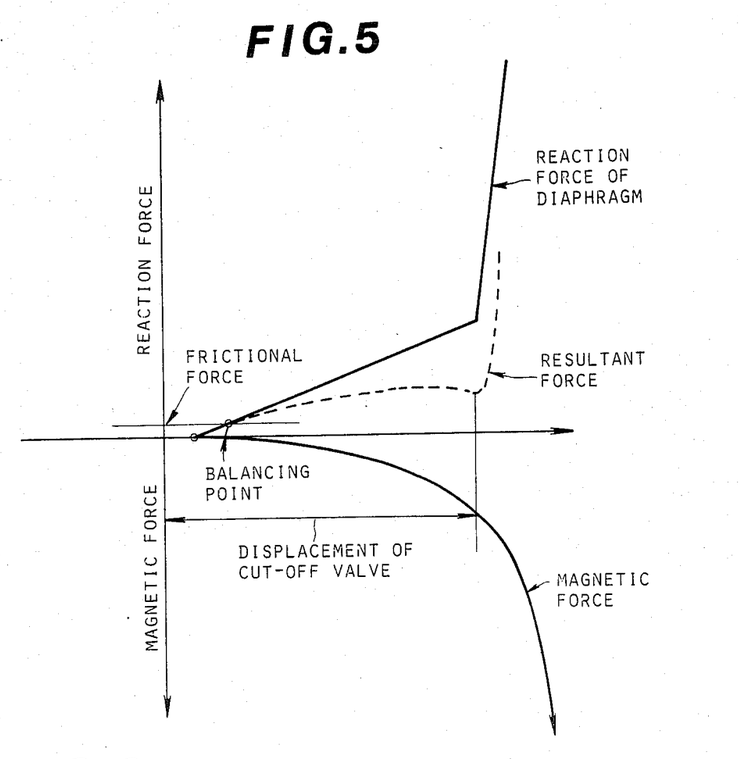
FIG. 5 is a graph of the relationship between magnetic force, diaphragm reaction force produced by the magnetic force, and displacement of the cut-off valve.

To avoid magnetic coupling between pole piece 70 and plunger housing 50, diaphragm 100 is designed to have a spring constant large enough to cancel the magnetic coupling force. That is, as shown in FIG. 5, the resultant force of the magnetic attraction force and the spring force of diaphragm 100 has a positive value, thereby stabilizing the positioning of cut-off valve 68. The spring force of diaphragm 100 is exerted on cut-off valve 68 so as to force cut-off valve 68 to the left in FIG. 2 so that if solenoids 72, 74 should fail and produce no magnetic force, cut-off valve 68 will be moved to the left in FIG. 2 to expose port 66, thereby decreasing the fuel injection quantity and therefore preventing the engine from running wild.

Figure 6:
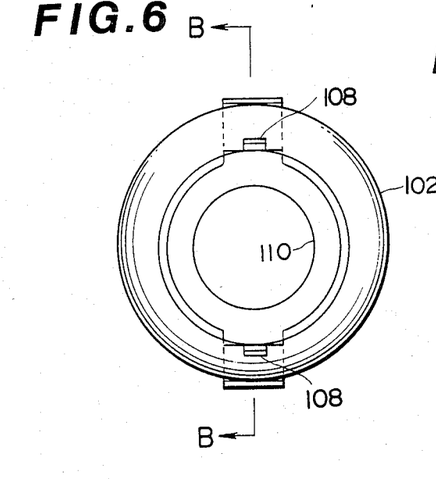
FIG. 6 is a front view of an assembly of a leaf spring and a magnetic ring.
Figure 7:
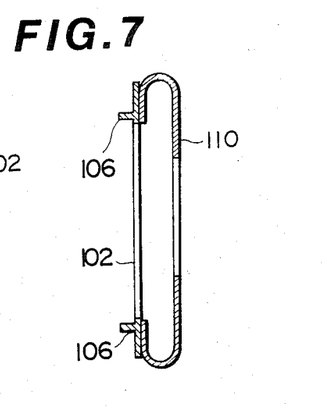
FIG. 7 is a cross-sectional view of the assembly of FIG. 6.

In FIGS. 6 and 7, there is shown a ring-like non-magnetic leaf spring 110, connected at upper and lower ends to magnetic ring 102, which may be used in place of diaphragm 100 of FIGS. 3 and 4. Use of this leaf spring 110 reduces manufacturing cost compared to use of diaphragm 100.

Figure 8:
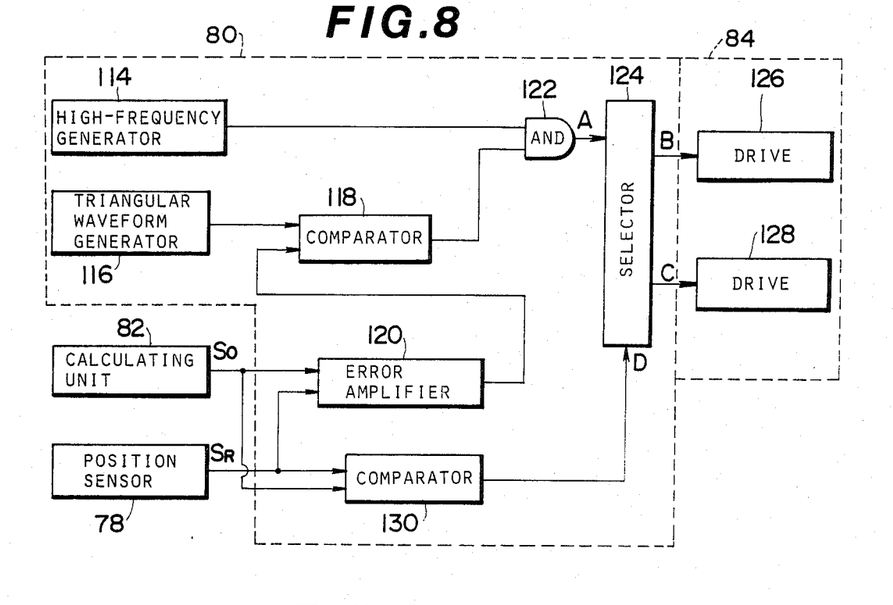
FIG. 8 shows details of the controller and associated elements of FIG. 1.
Figure 9:
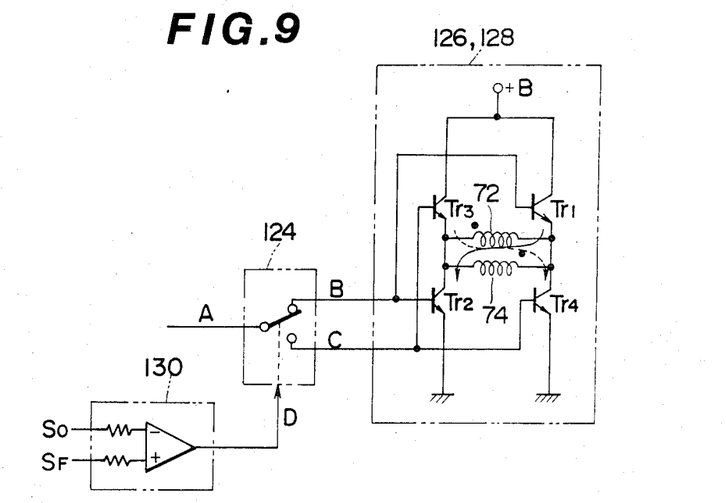
FIG. 9 is a schematic circuit diagram of combined several elements of FIG. 8.
Figure 10:
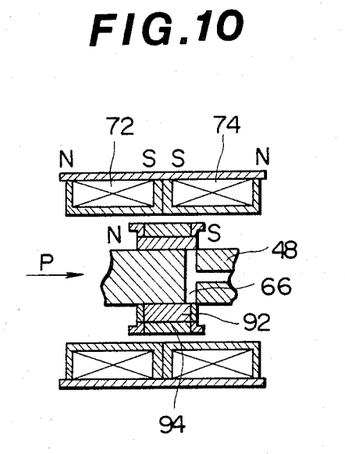
FIG. 10 is an illustration of one solenoid polarization mode.

Referring to FIGS. 8 and 9, there is shown the details of the controller 80 associated with other elements 78, 82, 84. Controller 80 includes a high-frequency generator 114 which produces a high-frequency square-wave pulse signal, a triangular waveform generator 116 which produces a triangular waveform signal, which may be an equilateral-triangular waveform signal, the top vertices of which coincide with the rising edges of the pulses of the signal from high-frequency generator 114 and the other vertices of which coincide with the falling edges of the pulses from high-frequency generator 114, and a comparator 118 which compares the triangular waveform signal to the output of an error amplifier 120 which amplifies the absolute value of the difference between the output $S_0$ of calculating unit 82, which outputs a signal indicative of a desired position of cut-off valve 68, and the output $S_R$ of position sensor 78. The output of comparator 118 goes high while the output signal of error amplifier 120 is higher than the output of triangular waveform generator 116 during which the output of high-frequency generator 114 is inputted via an AND gate 122 to selector 124. Selector unit 124, which may be an analog switch, connects the output of AND gate 122 to one of a pair of drive units 126, 128 which energizes solenoids 72, 74 with current either in one pair of polarities or in the other pair of polarities in accordance with the output of a comparator 130. When the desired value $S_0$ from calculating unit 82 is higher than the output $S_R$ of position sensor 78, the output of comparator 130 serves to connect the output A of AND gate 122 to an output terminal B of selector 124 at which time transistors $Tr_1$ and $Tr_2$ of drive units 126, 128 are rendered conductive and therefore solenoids 72, 74 are energized so as to have the polarities shown in FIG. 10, thereby moving cut-off valve 68 to close cut-off port 66 for fuel injection. On the other hand, when the desired value $S_0$ from calculating unit 82 is lower than the output $S_R$ of position sensor 78, the output of comparator 130 serves to connect the output A of AND gate 122 to an output terminal C of selector 124 at which time transistors $Tr_3$ and $Tr_4$ are rendered conductive and therefore solenoids 72, 74 are energized so as to have the polarities shown in FIG. 11, thereby moving cut-off valve 68 to open cut-off port 66 for stopping fuel injection.

Figure 11:
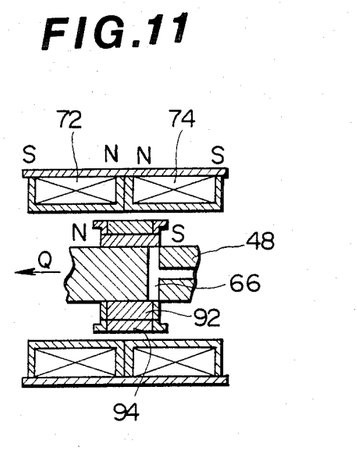
FIG. 11 is an illustration of another solenoid polarization mode.
Figure 12:
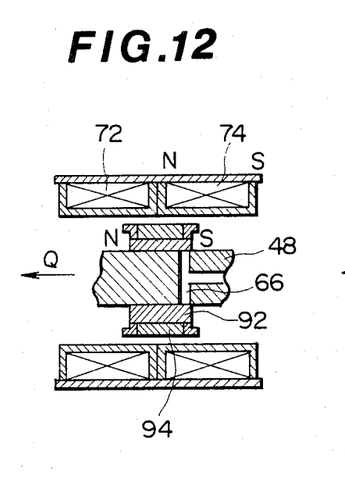
FIG. 12 is an illustration of the polarization magnetization of one of a pair of solenoids when the other solenoid fails, and the direction in which the cut-off valve moves.
Figure 13:
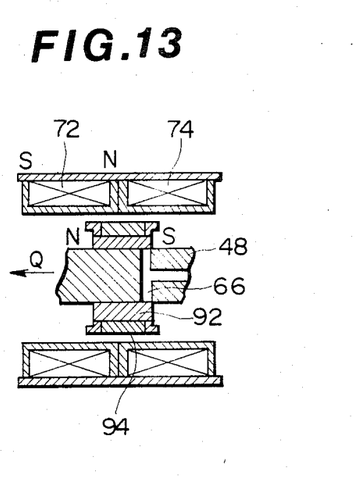
FIG. 13 is an illustration similar to FIG. 12 when the other of the pair of solenoids is magnetized and the first pair of solenoids fails.

When a signal indicative of a desired position of cut-off valve 68 is outputted from calculating unit 82 in the initial stage of pump operation, the output of position sensor 78 is zero since cut-off valve 68 is at its left-hand extreme. Accordingly, the output of comparator 130 goes high, in which case selector unit 124 supplies energizing current to drive unit 126 via contact A-B; rendering transistors $Tr_1$ and $Tr_2$ conductive to supply solenoids 72, 74 with energizing current so that solenoids 72, 74 will have the polarities shown in FIG. 10 to move cut-off valve 68 in the direction of arrow P in FIG. 10. When cut-off valve 68 arrives at the desired position, the output of error amplifier 120 is zero because the output of position sensor 78 equals the desired value so that the outputs of comparator 118 and therefore AND gate 122 are zero. Thus, no current will flow through solenoids 72, 74. On the other hand, when cut-off valve 68 goes beyond the desired position, the output of comparator 130 goes low so that selector unit 124 switches to contacts A-C to render transistors $Tr_3$ and $Tr_4$ conductive and therefore solenoids 72, 74 are supplied with energizing current which produces polarities as shown in FIG. 11 which propel cut-off valve 68 in the direction of arrow Q as shown in FIG. 11. If one solenoid 72 should fail when cut-off valve 68 is being driven in the direction Q in FIG. 11, no current would flow therethrough, but solenoid 74 would still be supplied with energizing current so as to produce polarities such as shown in FIG. 12, thereby producing electromagnetic force which moves cut-off valve 68 in the direction of arrow Q and opening cut-off port 66 to stop fuel injection. On the other hand, if solenoid 74 should fail when cut-off valve 68 is being driven in the direction Q in FIG. 11, no current would flow therethrough, but solenoid 72 would be supplied with energizing current so as to produce polarities such as shown in FIG. 13, thereby moving cut-off valve 68 in the direction of arrow Q and opening cut-off port 66 to stop fuel injection.

Figure 14:
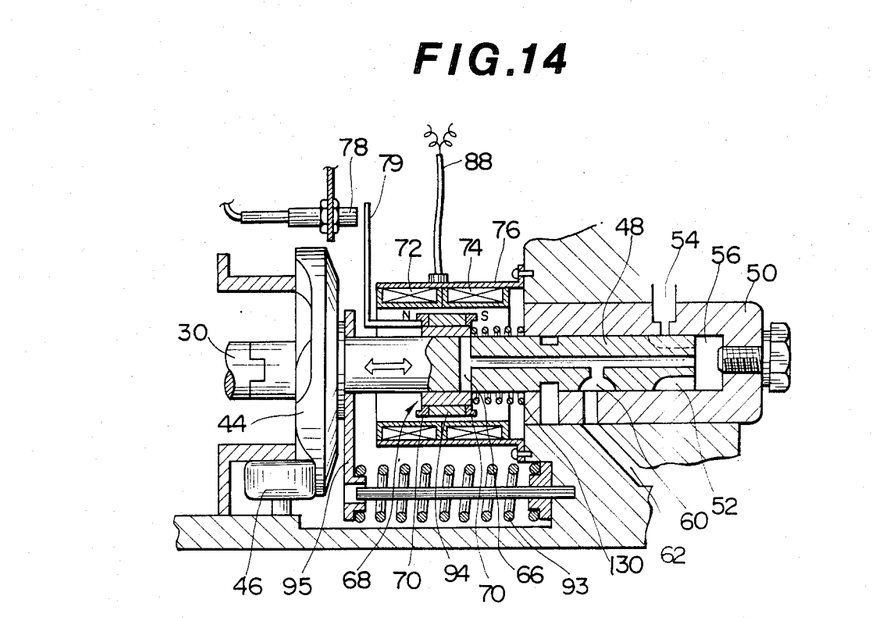
FIG. 14 is a cross-sectional view of the essential portion of a second alternative embodiment of the present invention.

Referring to FIG. 14, there is shown a second alternative embodiment which is the same as the FIG. 1 embodiment except that the second embodiment includes a coil spring 130 disposed around plunger 48 between cut-off valve 68 and plunger housing 50 in place of spring 100 of FIG. 2. Coil spring 130 tends to bias cut-off valve 68 to the left in FIG. 14 to uncover port 66, thereby allowing fuel to vent into chamber 40 to stop fuel injection when at least one of solenoids 72, 74 fails or the controller 80 malfunctions.

Figure 15:
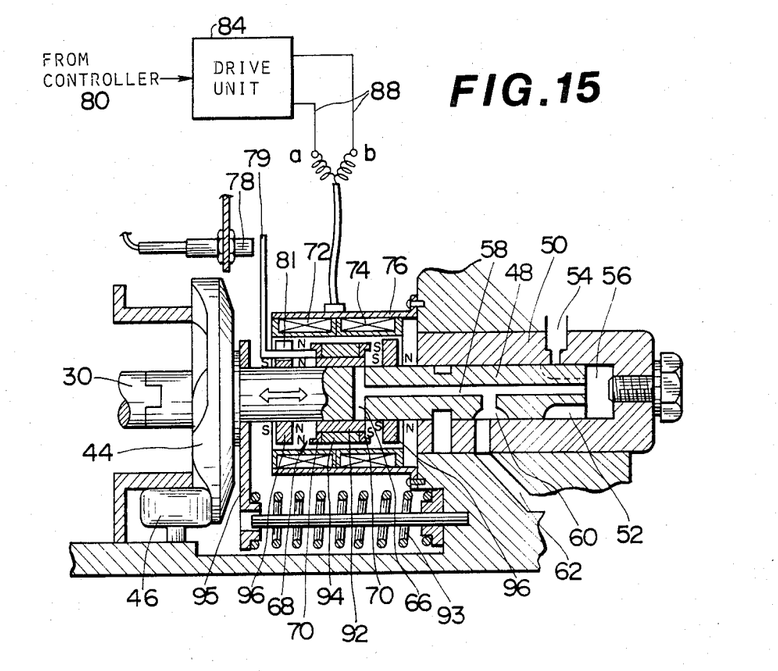
FIG. 15 is a cross-sectional view of a third alternative embodiment of the present invention.

Referring to FIG. 15, there is shown a third alternative embodiment of the present invention which is the same as the FIG. 1 embodiment except that the third embodiment includes a pair of permanent magnet discs 96, one disposed coaxially on each side of cut-off valve 68, separated therefrom, and oriented such that the polarities of the opposing faces of the permanent magnet discs 96 and of cut-off valve 68 are the same. The magnetic discs 96 serves to isolate cut-off valve 168 from the possible attractive force of plunger housing 50. Ferromagnetic extension 79 can move through a notch 81 provided in magnet 98 without being significantly influenced by the magnetic force produced by the left-hand magnet 98.

Figure 16:
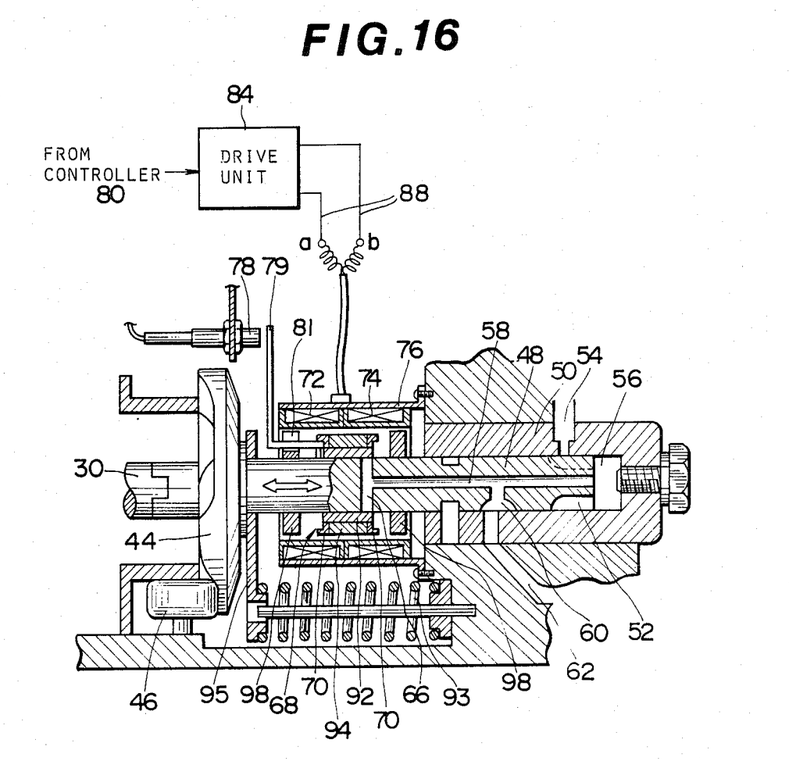
FIG. 16 is a cross-sectional view of a fourth alternative embodiment of the present invention.

Referring to FIG. 16, there is shown a fourth alternative embodiment of the present invention which is the same as the FIG. 15 embodiment except that the fourth embodiment includes a pair of discs 98 made of a nonmagnetic material such as aluminum or stainless steel, one disposed and spaced from each end of cut-off valve 68 and coaxial with cut-off valve 68 for preventing the occurrence of a magnetic coupling between cut-off valve 68 and plunger housing 50, thereby improving the control accuracy of cut-off valve 68, and that the pair of solenoids 72, 74 are energized such that the polarities of the opposing ends thereof are the same. The magnetic field produced by solenoids 72, 74 magnetically drives cut-off valve 68. The cut-off valve 68 accordingly moves relatively quickly in a direction determined by the polarities of magnet 94 and the direction of current flow. When energizing current flows in the opposite direction, cut-off valve 68 is moved in the opposite direction at a relatively high speed.

While the present invention has been described and shown in terms of preferred and alternative embodiments thereof, it should be noted that the present invention is not limited to these embodiments. Various changes and modifications could be made by those skilled in the art without departing from the spirit and scope of the present invention as set forth in the accompanying claims.

What is claimed is:

1. A fuel injection quantity adjustment apparatus for a fuel injection pump in an internal combustion engine, comprising:
   (a) a fuel injection plunger reciprocating axially within a fuel injection working space or chamber so as to force out fuel from within said working chamber to one of a plurality of fuel injectors, said plunger having a fuel injection cut-off port communicating between said working space and a reservoir chamber at a lower pressure than a predetermined pressure in the space so that fuel injection does not occur when said working space and said reservoir chamber communicate;
(b) a cut-off valve slidably engaging said plunger for blocking said cut-off port to prevent communication between said working chamber and reservoir chamber and thereby allow fuel injection, said cutoff-valve being substantially stationary with respect to the axial reciprocation of said plunger and having a magnetized portion;
(c) electromagnetic means for selectively producing magnetic fields of selectable polarity aligned along the axis of said plunger to displace said cut-off valve with respect to said plunger wherein said electromagnetic means comprises a pair of solenoids coaxial with, axially opposing, and radially separated from said cut-off valve, said solenoids being aligned end-to-end and wound so as to produce coaxial magnetic fields of opposite polarity;
(d) an electromagnetic sensor for detecting the position of said cut-off valve and outputting a signal indicative thereof; and
(e) a controller responsive to said sensor signal and to engine operating conditions for calculating a desired position of said cut-off valve in accordance with a desired fuel injection quantity, said controller comparing said sensor signal to said desired position and energizing said electromagnetic means to displace said cut-off valve toward the desired position as indicated by the difference between the desired position and the actual valve position indicated by said sensor signal.

2. The apparatus claimed in claim 1, wherein said cut-off valve includes a magnetic extension means extending radially outwards from said magnetized portion of said cut-off valve, the changing position of which is sensed by said sensor as the position of said cut-off valve.

3. The apparatus claimed in claim 1, wherein said cut-off valve includes a non-magnetic portion integral with and concentrically inside said magnetic portion for preventing magnetic short-circuiting between said plunger and said cut-off valve.

4. The apparatus claimed in claim 1 or 3, further including a pair of magnets, each axially displaced from one extreme of travel of said cut-off valve and arranged to have a polarity opposite to that of the magnetized portion of said cut-off valve.

5. The apparatus claimed in claim in 1 or 3, further including a pair of non-magnetic members, each displaced axially from one extreme of travel of said cut-off valve.

6. The apparatus claimed in claim 1 or 2, further including a biasing means disposed between said cut-off valve and a wall of said working chamber for biasing said cut-off valve against the magnetic attraction force exerted between said cut-off valve means and said wall.

7. The apparatus claimed in claim 6, wherein said biasing means is made of a non-magnetic material.

8. The apparatus claimed in claim 6, wherein said biasing means includes a non-magnetic diaphragm.

9. The apparatus claimed in claim 8, wherein said diaphragm is provided with a magnetic ring secured coaxially thereto which in turn is secured to said cut-off valve.

10. The apparatus claimed in claim 9, wherein said magnetic ring has a pair of pegs, said cut-off valve being provided with a pair of corresponding grooves into which said pair of pegs are fixedly received.

11. The apparatus claimed in claim 8, wherein said diaphragm is provided with an opening for allowing fuel flow therethrough.

12. The apparatus claimed in claim 9, wherein said diaphragm is provided with an opening for allowing fuel flow therethrough.

13. The apparatus claimed in claim 10, wherein said diaphragm is provided with an opening for allowing fuel flow therethrough.

14. The apparatus claimed in claim 6, wherein said biasing means includes a leaf spring.

15. The apparatus claimed in claim 14, wherein said leaf spring is made of a non-magnetic material.

16. The apparatus claimed in claim 15, wherein said leaf spring is provided with a magnetic ring secured coaxially thereto which is in turn secured to said cut-off valve.

17. The apparatus claimed in claim 16, wherein said magnetic ring has a pair of pegs, said cut-off valve being provided with a pair of corresponding grooves in which said pair of pegs are received.

18. The apparatus claimed in claim 1, wherein when one of said pair of solenoids fails, the other of said pair of solenoids is energized such that it has a magnetic polarity which moves said cut-off valve so as to uncover said cut-off port, thereby stopping fuel injection.

19. The apparatus claimed in claim 18, further including a second biasing means disposed between said cut-off valve and a wall of said working chamber for biasing said cut-off valve so as to uncover said cut-off port.

20. A method of adjusting a fuel quantity injected from a fuel injection pump in an internal combustion engine, the pump including a plunger which reciprocates axially to distribute pressurized fuel to respective injectors for engine cylinders and a cut-off valve including a permanent magnet and slidably fitted over the plunger, the plunger being provided with a fuel passageway and a cut-off port therein, the port preventing fuel injection when uncovered and capable of being covered and uncovered by the cut-off valve, a pair of solenoids disposed coaxially with and around the cut-off valve and aligned axially with each other, the method comprising the steps of:
(a) energizing the pair of solenoids such that the adjacent ends of the solenoids have the same polarity; and
(b) energizing one of the pair of solenoids when the other of the pair of solenoids fails with such a polarity so that the cut-off valve moves in the direction of uncovering the port in the plunger to prevent fuel injection via the plunger.

21. The method as claimed in claim 20, further including the step of moving the cut-off valve so as to uncover the port in the plunger when both of the solenoids fail.

* * * * *